United States Patent
Gunnarsson et al.

(10) Patent No.: US 10,299,178 B2
(45) Date of Patent: May 21, 2019

(54) METHODS AND APPARATUS FOR HETERGENEOUS NETWORK HANDOVER

(71) Applicant: Telefonaktiebolaget L M Ericsson (publ), Stockholm (SE)

(72) Inventors: Fredrik Gunnarsson, Linköping (SE); Angelo Centonza, Winchester (GB); Mojgan Fadaki, Solna (SE); Lars Lindbom, Karlstad (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 700 days.

(21) Appl. No.: 14/373,724

(22) PCT Filed: Dec. 3, 2012

(86) PCT No.: PCT/SE2012/051336
§ 371 (c)(1),
(2) Date: Jul. 22, 2014

(87) PCT Pub. No.: WO2013/112090
PCT Pub. Date: Aug. 1, 2013

(65) Prior Publication Data
US 2015/0031369 A1    Jan. 29, 2015

Related U.S. Application Data

(60) Provisional application No. 61/590,514, filed on Jan. 25, 2012.

(51) Int. Cl.
*H04W 36/00* (2009.01)
*H04W 36/04* (2009.01)
(Continued)

(52) U.S. Cl.
CPC ....... *H04W 36/04* (2013.01); *H04W 36/0072* (2013.01); *H04W 36/20* (2013.01);
(Continued)

(58) Field of Classification Search
CPC ..... H04W 36/04; H04W 36/18; H04W 36/30; H04W 36/32
(Continued)

(56) References Cited

U.S. PATENT DOCUMENTS

| | | | | |
|---|---|---|---|---|
| 2008/0273506 A1* | 11/2008 | Kezys | ................. | H04W 24/02 370/338 |
| 2012/0069756 A1* | 3/2012 | Ji | ................. | H04W 36/0016 370/252 |

(Continued)

FOREIGN PATENT DOCUMENTS

| | | |
|---|---|---|
| CN | 102413548 A | 4/2012 |
| WO | 2008020280 A1 | 2/2008 |

(Continued)

OTHER PUBLICATIONS

International Preliminary Report on Patentability and Written Opinion for PCT/SE2012/051336 dated Aug. 7, 2014, 13 pages.
(Continued)

*Primary Examiner* — Lester G Kincaid
*Assistant Examiner* — Matthew W Genack
(74) *Attorney, Agent, or Firm* — Withrow & Terranova, PLLC

(57) ABSTRACT

A first base station provides radio communication service to user equipments, UEs, and a second base station that provides radio communication service to UEs in adjacent cell service area. The first base station receives cell range expansion, CRE, information from the second base station for expanding the size of the first cell and evaluates handover of one or more UEs with respect to the second cell based on the CRE information. In one embodiment, the second base station determines a CRE related configuration that includes the CRE information with respect to the first cell, sends the CRE information to the first base station. For
(Continued)

CRE area and MUE measurement offset needed to detect weak Pico cell.

example, the second base station may send a handover request including the CRE information to the first base station. The second base station also may consider CRE information in handover evaluation.

31 Claims, 12 Drawing Sheets

(51) Int. Cl.
  *H04W 36/24* (2009.01)
  *H04W 36/20* (2009.01)
  *H04W 88/08* (2009.01)
(52) U.S. Cl.
  CPC ........ *H04W 36/24* (2013.01); *H04W 36/0055* (2013.01); *H04W 88/08* (2013.01); *Y02D 70/122* (2018.01); *Y02D 70/1242* (2018.01); *Y02D 70/1262* (2018.01); *Y02D 70/1264* (2018.01); *Y02D 70/142* (2018.01); *Y02D 70/146* (2018.01)
(58) Field of Classification Search
  USPC .................................................. 455/436–44
  See application file for complete search history.

(56) References Cited

U.S. PATENT DOCUMENTS

| | | | |
|---|---|---|---|
| 2012/0071200 A1 | 3/2012 | Bienas et al. | |
| 2012/0087247 A1* | 4/2012 | Min | H04W 36/0083 370/237 |
| 2012/0307808 A1* | 12/2012 | Song | H04W 36/0055 370/336 |

FOREIGN PATENT DOCUMENTS

| | | | | |
|---|---|---|---|---|
| WO | WO 2010104426 A1 * | 9/2010 | ............ | H04W 24/02 |
| WO | 2011136083 A1 | 11/2011 | | |
| WO | 2011136334 A1 | 11/2011 | | |
| WO | 2012151426 A1 | 11/2012 | | |

OTHER PUBLICATIONS

Author Unknown, "Technical Specification Group Radio Access Network; Evolved Universal Terrestrial Radio Access (E-UTRA); Radio Resource Control (RRC); Protocol specification (Release 10)," Technical Specification 36.331, Version 10.4.0, 3GPP Organizational Partners, Dec. 2011, 296 pages.
Author Unknown, "Technical Specification Group Radio Access Network; Evolved Universal Terrestrial Radio Access Network (E-UTRAN); X2 application protocol (X2AP) (Release 10)," Technical Specification 36.423, Version 10.3.0, 3GPP Organizational Partners, Sep. 2011, 132 pages.
Vajapeyam, M. et al., "Downlink FTP Performance of Heterogeneous Networks for LTE-Advanced," 2011 IEEE International Conference on Communications Workshops, Jun. 5-9, 2011, 5 pages.
International Search Report for PCT/SE2012/051336 dated Sep. 26, 2013, 4 pages.
Nokia Siemens Networks, "R3-103555: On X2 signaling for Tdm eICIC in Macro+Pico scenarios," 3rd Generation Partnership Project (3GPP), TSG RAN WG3 #70 Meeting, Nov. 15-19, 2010, 4 pages, Jacksonville, Florida.
Okino, Kenta, et al., "Pico Cell Range Expansion with Interference Mitigation toward LTE-Advanced Heterogeneous Networks," IEEE International Conference on Communications Workshops (ICC), Jun. 5-9, 2011, Kyoto, Japan, IEEE, 5 pages.
Saito, Yuya, et al., "Performance Investigation on Cell Selection Schemes Associated with Downlink Inter-Cell Interference Coordination in Heterogeneous Networks for LTE-Advanced," IEICE Transactions on Communications, vol. E94-B, Issue 12, Dec. 2011, The Institute of Electronics, Information and Communication Engineers, pp. 3304-3311.
Yagyu, Kengo, et al., "Investigation on Signaling Overhead for Mobility Management with Carrier Aggregation in LTE-Advanced," Ieice Transactions on Communications, vol. E94-B, Issue 12, Dec. 2011, The Institute of Electronics, Information and Communication Engineers, pp. 3335-3345.
Extended European Search Report for European Patent Application No. 12866961.1, dated Oct. 16, 2015, 7 pages.
First Office Action and Search Report for Chinese Patent Application No. 201280068128.0, dated Jul. 19, 2017, 19 pages.
Examination Report for European Patent Application No. 12866961. 1, dated Dec. 7, 2017, 6 pages.

* cited by examiner

CRE area and MUE measurement offset needed to detect weak Pico cell.

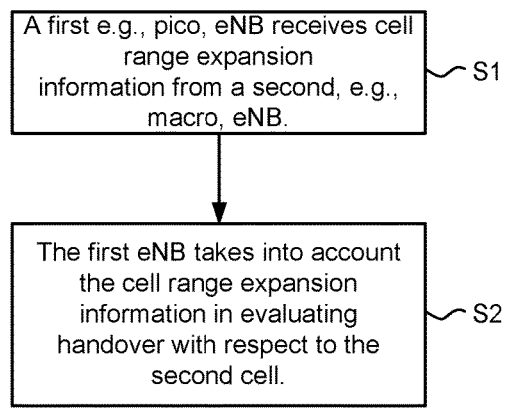
Figure 4
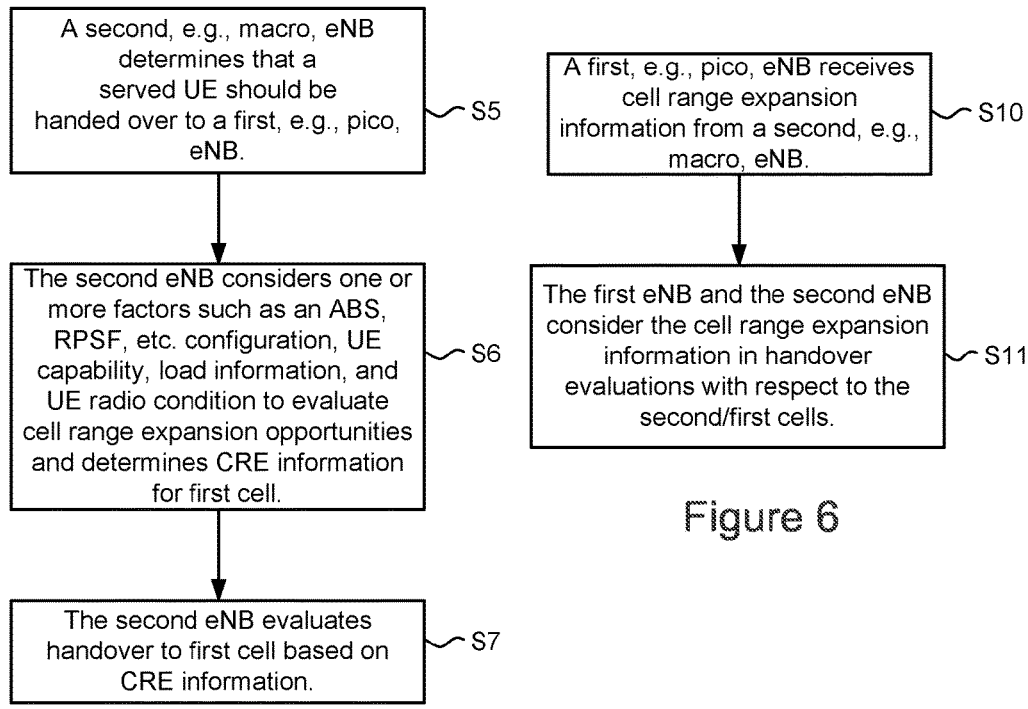
Figure 5
Figure 6

METHODS AND APPARATUS FOR HETERGENEOUS NETWORK HANDOVER

This application is a 35 U.S.C. § 371 national phase filing of International Application No. PCT/SE2012/051336, filed Dec. 3, 2012, the disclosure of which is incorporated herein by reference in its entirety.

TECHNICAL FIELD

The technology relates to radio communications, and in particular, to handover coordination in heterogeneous wireless networks.

BACKGROUND

The architecture of the Long Term Evolution (LTE) system for cellular radio communications uses an X2 logical interface between base stations called eNBs and an S1 logical interface between eNBs and a Mobility Management Entity (MME)/Serving Gateway (S-GW) (S1) as shown in FIG. 1. LTE is based on a "flat" architecture as compared to 2G and 3G systems. Each cell is served by an eNodeB or eNB base station, and handovers between cells can be handled either via a MME and the S1 interface or directly between the eNBs via the X2 interface. The radio access network is referred to as an Evolved-Universal Terrestrial Radio Access Network (E-UTRAN).

A cellular network typically includes some areas with high traffic, e.g., a high concentration of users. In those areas it may be desirable to deploy additional capacity to ensure user satisfaction. The added capacity may be in the form of additional macro base stations (e.g., more eNBs) and/or in the form of lower output power base stations. The latter cover a smaller area in order to concentrate the capacity boost in a smaller area. Examples include micro, pico, home base stations, relays, etc. Often, there are also areas with poor coverage where there is a need for coverage expansion, and one way to address these coverage issues is to deploy a low output power node to provide the coverage boost in a small area. A benefit with lower output power nodes in these situations is that their impact on the macro network is reduced, e.g., a smaller area in the macro network experiences interference.

A network deployment that uses both higher power macro nodes and lower power smaller nodes is referred to here as a heterogeneous network or "HetNet."Multiple layers in a HetNet are illustrated in the example of FIG. 2. A higher power macro base station (the high tower) provides a wide area coverage called a macro cell, and lower power nodes (the shorter structures) provide small area capacity/coverage in smaller cells. In this example, pico base stations and pico cells, relays and relay cells, and home base stations sometimes called femto base stations and femto cells are shown. Although FIG. 2 shows clusters of femto cells, single femto cell deployments may also be used.

Because cells in a HetNet typically operate with different pilot power levels, there can be imbalances between the radio uplink (UL) and the radio downlink (DL) in the network. Cells are typically selected by user equipments (UEs) based on their measurements of the received signal strength of downlink transmissions from those cells, with UEs being served by the best downlink cell alternative. However, the uplink quality depends mainly on the distance between the UE and the serving base station site and is generally independent of the serving cell's downlink pilot power. As a result of a UE's serving cell/base station selection being based on downlink pilot signals, UEs may have a better uplink signal quality to a non-serving cell. In this situation, Cell Range Expansion (CRE) may be used.

CRE is now described in conjunction with FIG. 3. A Macro UE (MUE) 11 served by the Macro eNB 10 is configured by the Macro eNB to detect further away cells that normally would not otherwise be detected by the MUE. For example, these further away cells may include those with a pilot signal 6 dB lower than the pilot signal of the macro cell 12. The extended area within which the MUE 11 can detect small cells with pilot signals below a predetermined threshold, whose particular value depends on the application, is called the Cell Range Expansion (CRE) area 18 of the smaller cell 16 to create a larger pico cell 20 served by the Pico eNB 14. In order to detect neighbor cells transmitting pilots with lower signal strength, the MUE is configured by the Macro eNB with a CRE measurement offset, as shown in FIG. 3.

Once such smaller cells are detected by the MUE and reported to the Macro eNB, the Macro eNB can decide to handover the MUE's connection to the detected smaller cell, which in FIG. 3 is served by a Pico eNB. The smaller cell and smaller eNB are in non-limiting examples referred to as a Pico cell 16, 20 and a Pico eNB 14, respectively, for illustration purposes only.

In the case of a handover from a macro cell to a Pico cell's Cell Range Expansion (CRE) area by configuring the UE to trigger to report a handover candidate via a larger measurement Offset, as shown in FIG. 3, the UE can report a handover target cell that would not have been a good handover candidate if evaluated without measurement offset. Once the UE is handed over to the CRE area of the Pico cell, it is undesirable for the UE to be immediately handed back over to the macro cell. Such handing back over undermines the benefits of CRE. To prevent this, the inventors realized that there needs to be some type of communication between the macro eNB and the pico eNB to ensure that the UE measurement configuration and any handover decision while camping on a CRE Pico cell are appropriately controlled and coordinated.

Such handover from macro cell to pico cell might be preceded by allocation of so-called Almost Blank Subframes (ABS) by the Macro eNB (see, e.g., 3GPP TS 36.331 and TS 36.423 incorporated herein by reference). ABSs are "protected subframes" where the Macro eNB temporarily limits the output power of its transmission so that UEs served by a smaller cell neighboring the Macro eNB experience reduced interference on such ABS subframes.

After the MUE is handed over to the small cell due to CRE, the small cell eNB may decide to serve the UE on ABSs, due to the otherwise high DL interference the UE would experience from the Macro eNB. Furthermore, the UE may be configured by the small cell eNB so to measure neighboring cells on ABSs to ensure that the measurements are not impacted by high levels of Macro eNB DL interference.

Recently a new technique has been introduced in 3GPP, similar to ABS, called Reduced Power SubFrames (RPSF) which includes subframes where the Macro eNB schedules data traffic for MUEs at a reduced Tx power. The RPSF technique differs from ABS in that no data traffic is supposed to be transmitted on ABS subframes. The RPSF can also be seen as an extension to ABS, where ABS can be said to either be configured with zero power or reduced power data and control transmissions.

To date, the CRE, ABS, and RPSF techniques exist in isolation in that there is currently no provision to coordinate the use of these techniques together or across different eNBs. Given that it is advantageous for a UE connected to a Pico cell and in the CRE area to be served on "protected" subframes, the absence of such mechanisms is a significant problem that needs addressing. Moreover, there is a need to communicate the configuration and use of RPSF between neighboring eNBs, e.g., to help interfered eNBs schedule transmission times for their UEs on protected subframes or to activate one or more specific interference cancellation techniques at the UE if it is known that interfering data traffic will be present on protected RPSF resources.

SUMMARY

A first base station provides radio communication service to user equipments, UEs, and has a first cell service area where the first cell service area is within or adjacent to a second cell service area of a second base station that provides radio communication service to UEs in the second cell service area. The first and second base stations may be for example a pico base station, micro base station, a home base station, a relay, a macro base station, etc. The first and second base stations may be the same type of base station or different types of base stations. According to one or more example embodiments, the first base station receives cell range expansion, CRE, information from the second base station for expanding the size of the first cell and evaluates handover of one or more UEs with respect to the second cell based on the CRE information.

The CRE information may include protected communication time information indicating when there is less interference affecting the first cell from the second cell. The first base station accepts handover of the one or more UEs from the second base station and serves the one or more UEs in a cell range expansion region of the first cell during protected communication time periods. Example CRE information includes one or more of: a cell load in the first cell, a cell load in the second cell, protected time information like Almost Blank Subframe (ABS) information associated with the second base station and reduced power subframe information associated with the second macro base station, one or more measurement or evaluation offsets, maximum power level information, or UE capability information. It may be desirable for the first base station to send a message to the one or more UEs in a cell range expansion region of the first cell to activate interference cancellation.

In one example implementation, the CRE information includes a CRE offset for UE handover measurements to increase a probability of UE handover from the second cell to the first cell. Alternatively, the first base station may determine the CRE offset based on the CRE information to increase a probability of UE handover from the second cell to a CRE area of the first cell. In either case, the CRE offset may be provided to one or more UEs.

After receiving UE measurement reports from one or more reporting UEs provided the CRE offset, the first base station may determine whether to request handover of the one or more reporting UEs to the second base station. For example, the first base station may decide to not send a handover request of the one or more reporting UEs to the second base station having recently been handed over from the second base station to a CRE area of the first cell.

The first base station may further receive handover of a UE connection from the second cell in a CRE area of the first cell.

If the first base station determines that the received CRE information is inappropriate, then it may send a message to the second base station requesting that the CRE information be reconsidered.

In an example implementation, the first base station may receive CRE information from the second base station in one of the following: a radio resource control, RRC, UE context, a handover cause, a dedicated UE-specific CRE information element including in signaling from the second base station, or cell-relation specific information control signaling.

In one or more example embodiments related to the second base station, the second base station has a set of handover candidate base stations and determines CRE for expanding the size of the first cell for at least one of the candidate base stations. The second base station evaluates handover of one or more UEs with respect to the first cell based on the CRE information.

Based on the CRE information, the second base station may determine a CRE offset for UE handover measurements to increase a probability of UE handover from the second cell to a CRE area of the first cell and provide the CRE offset to one or more UEs.

For one example implementation, the second base station determines a CRE offset based on the CRE information with respect to the first cell, receives one or more measurement reports from the one or more UEs relating to the first base station, evaluates a possible handover of the one or more UEs to the first base station based on the CRE offset applied to the one or more measurement reports, and based on the evaluation, sends a handover request to the first base station for the one or more UEs being served by the second base station. Alternatively, the measurement report receiving step may follow the sending the CRE offset step.

In another example implementation, the second base station determines a CRE related configuration that includes the CRE information with respect to the first cell, sends the CRE information to the first base station, and receives a handover request from the first base station for one or more UEs being served by the first base station.

If the higher power base station receives a message that the CRE information is inappropriate, it may determine new CRE information and send the new CRE information to the first base station.

In one example implementation, the first base station has a lower output power than the second base station, and the service area of the first cell is smaller than the service area of the second cell.

BRIEF DESCRIPTION OF THE DRAWINGS

FIG. 4 is flowchart of non-limiting example procedures that may be implemented by a Pico eNB;

FIG. 5 is flowchart of non-limiting example procedures that may be implemented by a Macro eNB;

FIG. 6 is flowchart of non-limiting example procedures that may be implemented by a Pico eNB and a Macro eNB to coordinate and consider CRE in handover evaluation with respect to the Pico eNB and Macro eNB;

DESCRIPTION OF NON-LIMITING EXAMPLE EMBODIMENTS

Figure 1:
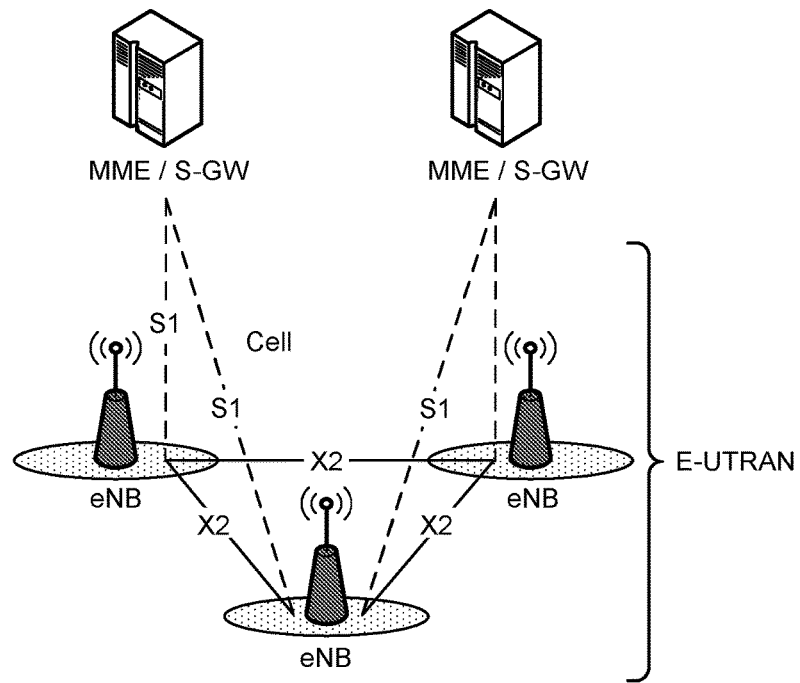
FIG. 1 shows a simplified version of an example LTE communications network.
Figure 2:
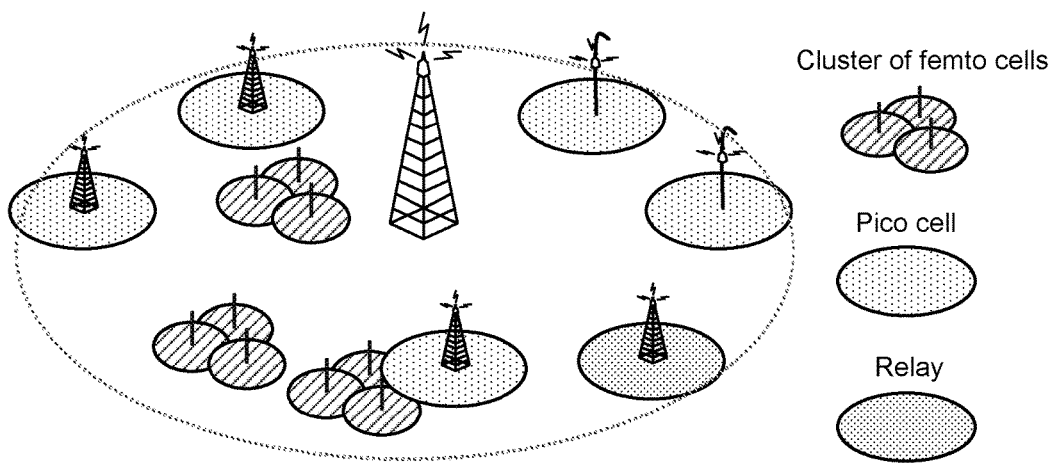
FIG. 2 shows an example of a HetNet.
Figure 3:
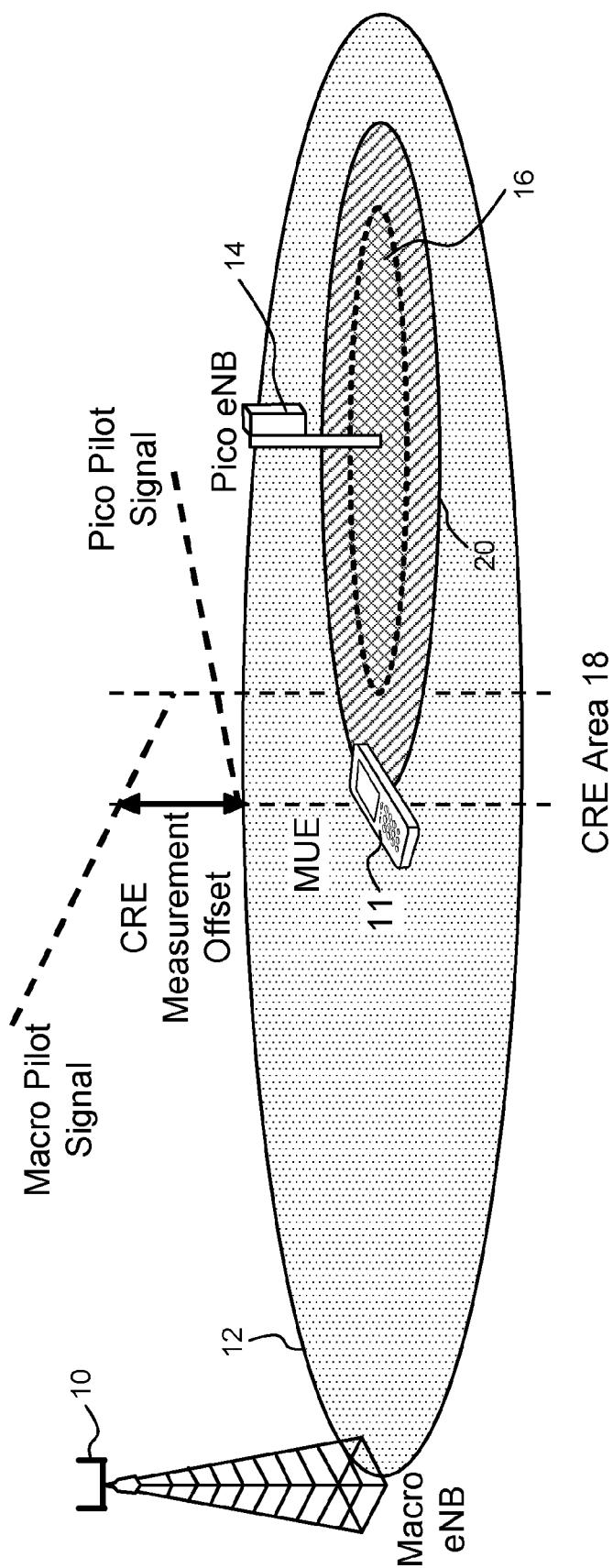
FIG. 3 shows an example of a CRE Area and a Macro UE (MUE) measurement offset needed to detect weak Pico cell.

The following sets forth specific details, such as particular embodiments for purposes of explanation and not limitation. But it will be appreciated by one skilled in the art that other embodiments may be employed apart from these specific details. In some instances, detailed descriptions of well known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Although the description is given for user equipment (UE), it should be understood by the skilled in the art that "UE" is a non-limiting term comprising any wireless device or node equipped with a radio interface allowing for at least one of: transmitting signals in the UL and receiving and/or measuring signals in the DL. Some examples of UE in its general sense are a PDA, laptop, mobile, sensor, fixed relay, mobile relay, and a radio network node (e.g., an LMU or a femto base station or a small base station using the terminal technology). A UE may be and preferably is capable of operating or at least performing measurements in one or more frequencies, carrier frequencies, component carriers or frequency bands. A UE may operate in a single-RAT, a multi-RAT, or a multi-standard mode, e.g., an example dual-mode UE may operate with any one or a combination of WiFi and LTE.

A cell is associated with a base station, and a cell is further associated with a carrier frequency and a radio access technology. A base station comprises in a general sense any node transmitting radio signals in the downlink (DL) and/or receiving radio signals in the uplink (UL). Some example base stations are eNodeB, eNB, Node B, macro/micro/pico radio base station, home eNodeB, relay, repeater, sensor, transmitting-only radio nodes or receiving-only radio nodes. A base station may operate and/or perform measurements in one or more frequencies, carrier frequencies or frequency bands and may be capable of carrier aggregation. A base station may also use a single-radio access technology (RAT), a multi-RAT, or operate using a multi-standard node, e.g., using the same or different base band modules for different RATs.

A subframe may be any time interval, time period, or time slot, which may be pre-defined. An example is an LTE subframe.

The signaling described is either via direct links or logical links, e.g., via higher layer protocols and/or via one or more network nodes. For example, signaling from a coordinating node may pass another network node, e.g., a radio node.

The example embodiments are not limited to LTE, but may apply to any Radio Access Network (RAN), single-RAT or multi-RAT. Some other RAT examples are LTE-Advanced, UMTS, GSM, cdma2000, WiMAX, and WiFi.

Embodiments described herein may be considered as independent embodiments or may be considered in any combination with each other to describe non-limiting examples. In the non-limiting examples below, an eNB is used as an example base station, a macro base station or eNB is used as the example of, and the term includes, any type of higher power base station serving a larger cell, referred to as a macro cell, and a pico base station or eNB is used as the example of, and the term includes, any type of lower power base station serving a smaller cell, referred to as a pico cell. It is to be understood, however, that the base stations and cells may be of the type same and/or size, e.g., the base stations may be both macro base stations or both pico base stations, the larger and smaller cells may be both macro cells or both pico cells, etc. The cells may also be of equal size. For example, a smaller cell may be considering extending its uptake area by a cell range extension towards a larger cell. The two cells may be adjacent to each other, overlap each other partially, overlap completely, or one cell is completely contained within the other cell.

A non-limiting example embodiment coordinates cell range expansion (CRE) use between a macro cell and a Pico cell. In the flowchart in FIG. 4, a first, e.g., pico, eNB receives from a second, e.g., macro, eNB cell range expansion (CRE) information, e.g., a cell range expansion offset applicable to all or a subset of the UEs served by the first eNB, or information from which the first eNB can derive the cell range expansion (step S1). Information is exchanged using handover signaling, other existing signaling (e.g., existing X2 signaling), and/or new signaling (e.g., new X2 signaling) so that both the first and second eNBs are aware of the expansion of the CRE area between their respective first and second cells. The first eNB takes into account the cell range expansion information in evaluating handover with respect to the second cell (step S2).

The second cell may also be seen as an aggressor cell transmitting data to a served UE or scheduling a served UE in the uplink such that a UE served by a victim cell (the first cell in this example) experiences interference in either the uplink or downlink. The aggressor cell may either be a current aggressor cell (is causing interference) or a potential aggressor cell (could cause interference). Accordingly, a victim cell receives cell range expansion information from an aggressor cell, and the victim cell takes into account that cell range expansion information in handover evaluations with respect to the aggressor cell.

Alternatively, a macro eNB might decide that it is beneficial to handover the UE to a neighbor pico eNB for load balancing reasons or to improve the UE uplink performance. The macro eNB provides cell range expansion information (e.g., ABS, RPSF, etc. patterns) to the Pico eNB, and the UE is handed over to the Pico eNB. By introducing ABS, RPSF, and/or similar patterns, Pico cell edge UE throughput improves and a risk of Pico cell edge UEs being subject to Radio Link Failure, RLF, decreases. The decision to allocate protected subframes or to increase the density of protected subframes may depend on one or more factors such as the Macro cell's traffic load as well as of the traffic load among cell edge UEs served by Pico eNB's within the Macro cell coverage area. The experience of high macro interference is likely due to high macro traffic load, and allocating ABS/RPSF patterns for reducing the interference towards Pico (cell edge) UEs is preferably balanced with macro capacity. Another factor for the Macro eNB to take into account is the likelihood that the cell edge Pico UEs are handed over to the Macro eNB, and for that reason, it may be beneficial to establish a Pico CRE area.

FIG. 5 is flowchart of non-limiting example procedures that may be implemented by a second, e.g., Macro, eNB. The second eNB identifies a set of served UEs as a handover (HO) candidate to a first, e.g., Pico, eNB (step S5). The second eNB reconfigures one or more measurement and measurement reporting criteria and considers one or more of a protected subframe, e.g., ABS, RPSF, etc., configuration, UE capability, load information, UE capabilities, and radio conditions to evaluate cell range expansion opportunities and determines CRE information for the first cell (step S6). The second eNB configures cell range expansion for one or more UEs to handover one or more UEs from second cell to the first cell in the CRE region, e.g., to balance load, improve UE uplink conditions or performance, etc., and evaluates handover to the first cell based on the CRE information (step S7).

FIG. 6 is flowchart of non-limiting example procedures that may be implemented by a first, e.g., Pico, eNB and a second, e.g., Macro, eNB to coordinate and consider CRE in handover evaluation with respect to the first eNB and second eNB. When coordinated, both the first eNB and the second eNB consider the same cell range expansion for one or more served UEs. A first eNB receives cell range expansion information used to trigger handover to the first eNB from a second eNB (step S10). The first eNB and the second eNB consider the cell range expansion information in subsequent handover evaluations with respect to the second/first cells (step S11), and in particular, whether to handover a UE connection back to the second eNB after it has been handed over to the CRE region of the first cell.

Coordination of CRE usage between a macro cell and a Pico cell may occur in different scenarios. In a first example scenario, a UE connection for a UE attached to a Macro cell is handed over to a Pico cell when the UE is communicating from the CRE area. Example reasons for initiating the handover could, e.g., be reducing load in the macro cell, the UE is better served by the Pico eNB from an uplink performance perspective, and other reasons. After handover completion, the Pico eNB also knows the extent of the CRE decided, or considered, by the Macro eNB. Thereby, the Pico eNB can avoid handing the UE directly back by evaluating a handover criterion without CRE.

A Macro eNB may determine that it would be beneficial to handover a set of one or more UEs to a neighbor Pico cell even for situations where the Reference Signal Received Power (RSRP) from a target candidate Pico cell is considerably smaller than the corresponding RSRP from the serving Macro cell. To do that, the Macro eNB configures UEs capable of operating in Pico CRE areas to report RSRP from target cells that are much weaker than the serving Macro cell. The reporting of UE measurements may be configured to be periodic or event-triggered.

Example reasons why the macro eNB discloses that one or more UEs are candidates for handover to pico eNB include to offload the macro eNB in favor of the pico eNB, improve UE uplink performance, and/or avoid uplink interference to the pico eNB from a UE served by the macro. An interfering UE may be identified via an uplink interferer identification mechanism.

The Macro eNB may configure (all or a selected subset) of the UEs with a specific measurement offset so each UE reports potential target candidate pico cells extended by a CRE area. For example, the offset defined in 3GPP TS 36.331 can be applied to the event-triggering report criteria "Event A3 (Neighbor becomes offset better than PCell)" as well as "Event A6 (Neighbor becomes offset better than SCell)." Thus, a UE reports when a neighbor cell becomes a better offset relative to the serving cell. This offset can be configured by sending to the UE the ReportConfigEUTRA IE via the RRC protocol.

Alternatively, the Macro eNB may also select a subset (one or more) of the UEs and configure those UEs to report a radio condition from serving and neighboring cells. Based on the report, the macro eNB evaluates which of the UEs are handover candidates. This evaluation may be performed by comparing the radio conditions taking into account measurement offsets. A UE may use a configured measurement offset to report measurements, and UEs may be requested to report measurements and offsets are used in an evaluation step in the eNB.

Figure 7:
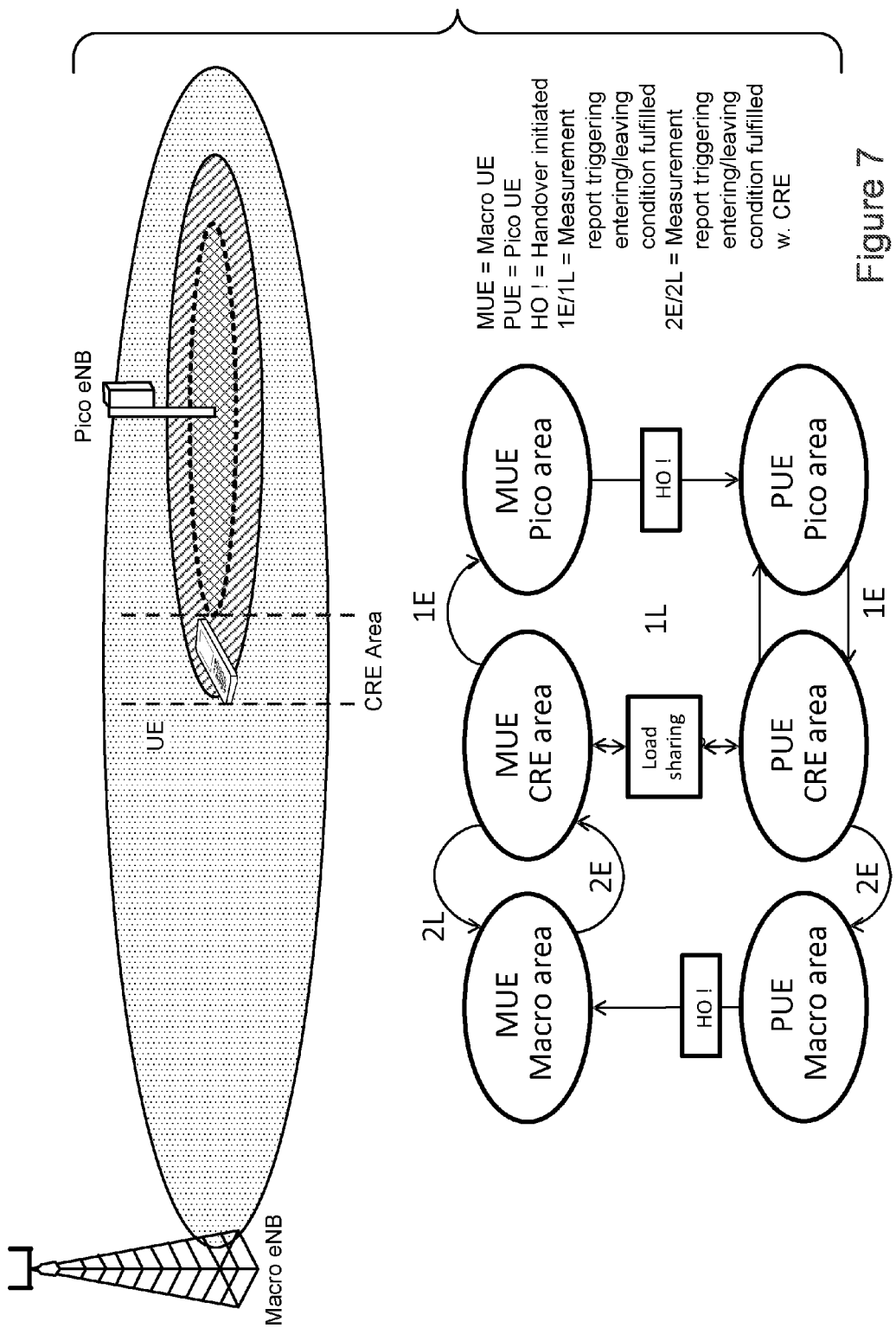
FIG. 7 shows a state transition diagram in the Pico eNB and Macro eNB with respect to a UE.

FIG. 7 shows a state transition diagram in the Pico eNB and Macro eNB with respect to a UE. It illustrates how the Macro eNB and Pico eNB can be aware of whether a UE resides inside a CRE area by configuring event-triggered reports from the UE. A UE served by the Macro eNB is configured with at least two event-triggered measurement report configurations. One configuration resembles ordinary reports typically used for handovers. Those event triggers may be based on filtered measurements with respect to serving cell Sc and a neighboring candidate cell Nc. The triggering condition must be fulfilled for a specific time (a time to trigger), and the trigger may be configured with an offset (Off) and a hysteresis (Hys). The event entering condition may be fulfilled if Nc>Sc+Off+Hys (condition 1E). Similarly, the event leaving condition may be fulfilled if Nc<Sc+Off−Hys (condition 1L). When the entering condition is fulfilled, the UE may be asked to report periodically until a maximum number of measurement reports is reached or a cell leaving condition is fulfilled. An event trigger may also be configured with a CRE, typically implemented as a cell individual offset, CIO. In this case, the CIO may be equal to the CRE. The event entering condition may then be fulfilled if Nc+CRE>Sc+Off+Hys (condition 2E). Similarly, the event leaving condition may be fulfilled if Nc+CRE<Sc+Off−Hys (condition 2L).

The state diagram shows how such events may be configured in the UE so that base stations know which UEs reside in the CRE area, and as such, are candidates for load sharing. A Macro UE in the macro area may trigger a report of condition 2E and thereby inform the serving macro base station that it now has entered the CRE area of a particular pico base station. If the leaving condition 2L triggers, then the base station detects that the UE is back in the macro area. A macro UE that also triggers the 1E condition informs that it has entered the area where the Pico base station is most favorable in both uplink and downlink, and the macro base station hands over the UE to the Pico base station. UEs in the CRE area may be load shared at any time when the serving base station finds it beneficial. For UEs served by the Pico base station, the same event triggering applies.

The selection of a specific measurement/evaluation offset value to be considered may be based on one or more of a number of factors. Some example factors include: (1) the UE capabilities (e.g., whether it supports cell detection in CRE or whether it is capable of specific interference mitigation techniques), (2) the radio conditions the UE is affected by, (3) neighbor cell measurements performed by the UE and by other UEs in the neighborhood, (4) previously received interference information via X2: LOAD INFORMATION message from neighbor eNBs, (5) the load of the serving cell, and/or (6) ABS configuration and/or RPSF configuration of the serving cell.

An alternative to measurement report triggering by event A3 (or A6) could be "Event A5 (PCell becomes worse than threshold1 and neighbor becomes better than threshold2)." In this example case, the UE is configured with two thresholds and reporting starts when radio conditions in serving cell and neighbor cell(s) meet the criteria.

In order to detect weak neighbor cells, a Macro eNB may configure UEs capable of operating in Pico CRE areas with resource-restricted RRM (mobility) measurements as well as with Radio Link Monitoring (RLM) measurements (see 3GPP TS 36.331). By configuring such measurements, UEs perform measurements in subframes where the serving Macro eNB intends to reduce its transmission activity or reduce the data transmission power, i.e., subframes allocated as ABS, RPSF, and/or similar A UE can then perform neighbor cell measurements without being severely interfered by the serving cell, which increases the chances of correctly detecting neighbor cells. Using resource-restricted RLM measurements reduces the risk of a UE declaring a Radio Link Failure (RLF) when handed over to Pico CRE areas.

Configuration of resource-restricted measurements is preferably done in a way that re-configurations are avoided when changing serving cell. For example, macro cells preferably coordinate ABS, RPSF, and/or similar subframes used for resource-restricted measurements. The Macro eNB may for example send ABS, RPSF, and/or similar protected subframe information via an X2: LOAD INFORMATION message to the Pico eNB. The subframes considered for this type of mobility and RLM-related measurements may be a subset of allocated ABS, RPSF, and/or similar protected subframes. The decision to configure UEs with resource-restricted RRM and RLM measurements may depend on an amount of CRE.

If RPSF patterns are configured, then the macro eNB may evaluate what the appropriate maximum data transmission power allowed in the RPSF subframes is assigned for UE measurements given the particular radio conditions of the UE. Once such evaluation is done, the macro eNB may ensure that the maximum RPSF power on the RPSF subframes to be used is not exceeded. The Macro eNB may, via higher layer signalling, inform UEs about the power differences between resources carrying data and reference signals in certain subframes. If the UE uses the serving cell reference signal as a phase and power reference for demodulation as well as for Channel State Information (CSI) determination, the UE uses such information to demodulate data transmissions based on higher order modulation schemes (such as 16QAM and 64QAM) as well as to derive CSI feedback correctly. However, if the UE is using channel state information reference signals, as is available in 3GPP LTE Release 10, then the UE can operate without knowing the RPSF power level.

Figure 8:
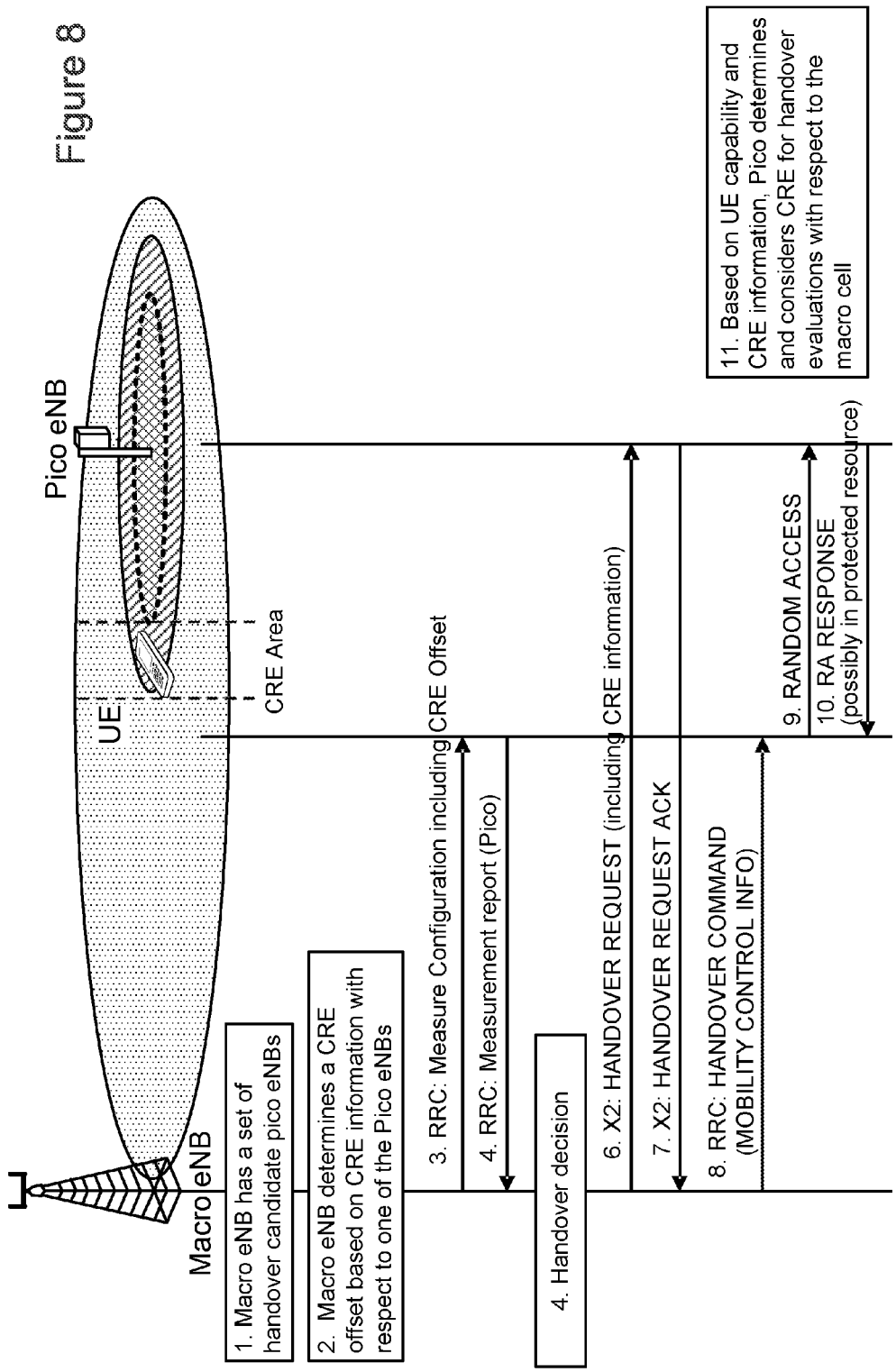
FIG. 8 is a non-limiting example signaling diagram showing coordination of CRE during handover from a Macro cell to a Pico cell.

FIG. 8 is a non-limiting example signaling diagram showing coordination of CRE during handover from a Macro cell to a Pico cell and includes a message sequence 1-11 detailing example signalling and procedures when a Macro eNB hands over a UE that is served by the macro cell. At step 1, the Macro eNB has a set of handover candidate Pico eNB neighbors. At step 2), the Macro eNB determines a CRE offset based on CRE information with respect to one of the pico eNB neighbors. The Macro eNB then sends to a macro UE in the Macro cell an RRC Measurement Configuration message at 3) which includes the CRE offset. The RRC Measurement Configuration message is sent to the UE in order to configure the one or more criteria according to which to the UE should report neighbor cells. Such criteria include for example setting the offset or the thresholds of Event A5. Depending on available Macro eNB interference mitigation schemes (e.g., ABS, RPSF, and/or similar), the Macro eNB may also determine a max offset x that allows the UE to avoid Radio Link Failures after handing over to the Pico cell. This may also take into account an uplink guaranteed bitrate. In step 3), the Macro eNB may also configure the UE with resource-restricted mobility measurements in order to enhance the detection of weak neighbor cell signals.

At 4), the Macro eNB receives a measurement report from the UE that satisfy the measurement reporting criteria configured in 3) including measurements for the Pico eNB (as a result of using the CRE offset for the Pico eNB). A decision is made to hand the UE connection from the Macro eNB to the Pico eNB at 5) based on UE radio conditions, interference mitigation mechanisms that may be available, the CRE extension, load sharing to the pico eNB, uplink performance, and other factors.

Step 6) shows an X2: HANDOVER REQUEST message sent to the Pico eNB which includes CRE information determined by the Macro eNB. The CRE information may include one or more of: a cell load in the macro cell, a cell load in the micro cell, Almost Blank Subframe (ABS) information associated with the macro base station, reduced power subframe information associated with the macro base station, one or more measurement or evaluation offsets, maximum power level information, or UE capability information. In one example implementation, the X2: HANDOVER REQUEST may also include an RRC Context IE in which the measurement configuration and capabilities for the handing over UE are stored. The measurement configuration provides information about the selected measurement offset x configured by the Macro eNB, while the UE capabilities provide information about whether the UE is capable of any specific interference mitigation technique or if the UE is able to support CRE. Additionally, the X2: HANDOVER REQUEST message may include a new information element (IE) named CRE Configuration IE specifically indicating the CRE Offset x dB selected by the Macro eNB for this UE. Alternatively, the X2: HANDOVER REQUEST message may include a handover cause which indicates load balancing, load sharing, offloading, or other causes. When this is the case, the Pico eNB may consider the RRC measurement as the CRE offset that should be maintained to avoid the UE from handing back over directly to the handover originating Macro eNB.

Step 7) shows an X2: HANDOVER ACKNOWLEDGEMENT message from the Pico eNB, and step 8) is an RRC: HANDOVER COMMAND message sent to the UE that includes mobility control information. Steps 9 and 10 are the RACH Access message sent by the UE to the Pico eNB followed by the RACH Access Response from the Pico eNB, respectively. The latter may be sent by the Pico eNB on a protected subframe if the macro eNB previously signaled the presence of such protected subframes. The Pico eNB decision to send the RACH response message in either protected or non-protected subframes may be made based on the received CRE Offset but may also depend on information on the traffic load in the Macro eNB. A large CRE offset and a high macro traffic load indication may indicate for example RACH response messages in protected subframes. In step 11), based on the UE capability and CRE information received from the macro eNB, the Pico eNB determines and considers CRE for handover evaluations with respect to the macro cell.

The CRE information may for example be included as a measurement offset in the RRC Container IE, included as a separate IE, or included as ABS, RPSF, and/or similar information from which the pico can determine an appropriate CRE. Furthermore, the Pico eNB may deduce that the handover was due to offloading of the UE in the CRE area, for example, because CRE information was present. Additionally a new handover cause value may be defined that specifies that the handover was due to CRE offloading.

The Pico eNB evaluates the offset configured for the UE and determines the CRE to be maintained for its pico cell. For example, if the offset is set to 9 dB, then the CRE that the Pico eNB maintains is 9 dB, provided that the UE capabilities can support this mode of operation. Such CRE may be achieved for example by modifying the Cell Individual Offset (CIO) from the Pico eNB to the Macro eNB or by setting an appropriate measurement offset for the UE attached to the Pico eNB.

Figure 9:
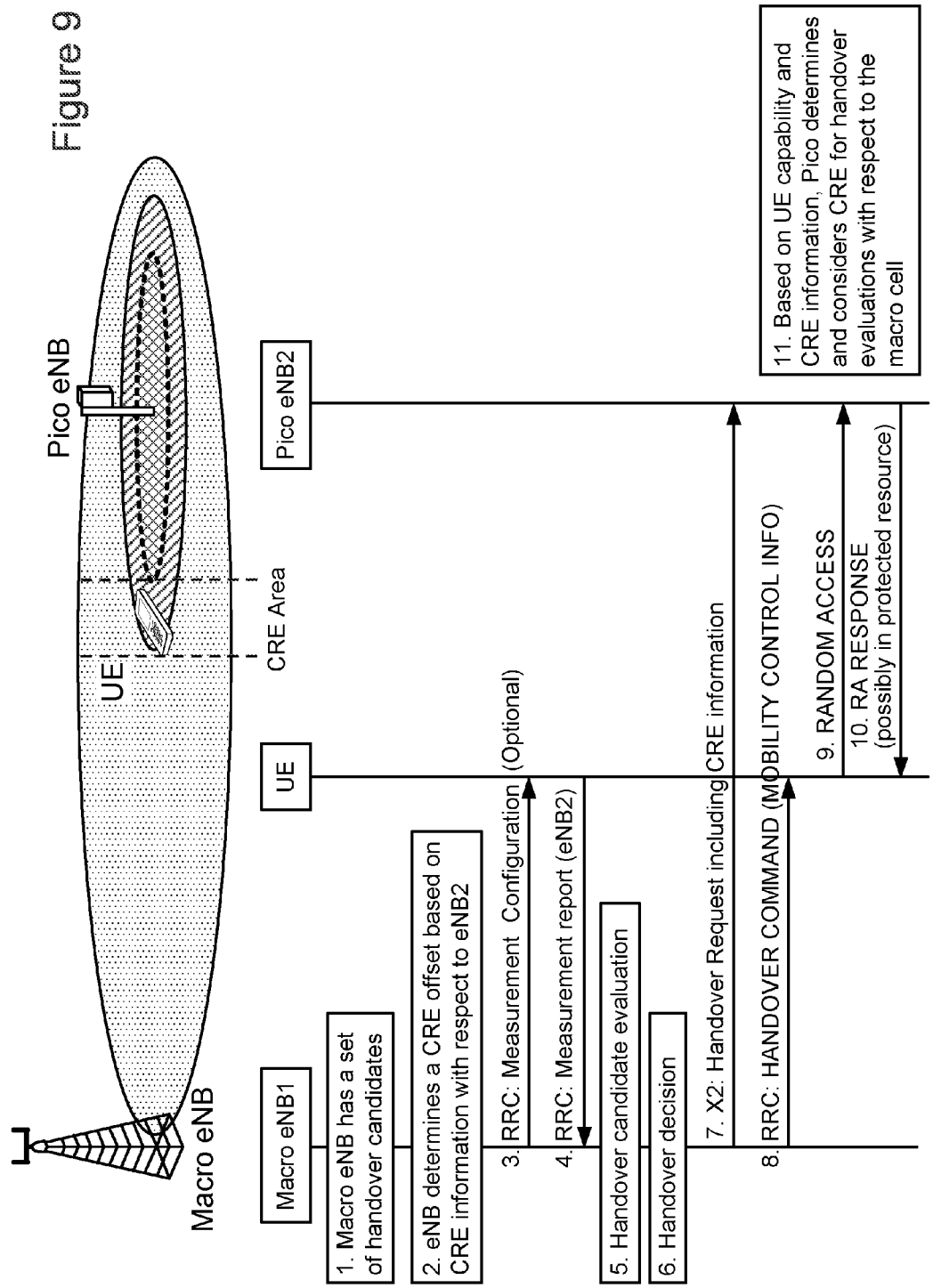
FIG. 9 is a non-limiting example signaling diagram showing coordination of CRE during handover from a Macro cell to a Pico cell.

FIG. 9 is a non-limiting example signaling diagram showing coordination of CRE during handover from a Macro cell to a Pico cell that is similar to that in FIG. 8. But in this embodiment, the RRC: Measurement configuration message is optional and need not be sent to the UE. As a result the RRC: Measurement report from the UE with respect to the Pico eNB neighbor will not have a CRE offset applied. Accordingly, at step 5), the Macro eNB applies the CRE offset to those measurements in its handover candidate evaluation before making the handover decision at 6). The other steps 1)-4) and 7)-11) are the same as in FIG. 8.

There are many options for transferring the CRE information from the Macro eNB to the Pico eNB. Examples include:

(1) the RRC UE context, and possibly also a CRE indication. This indication could be the handover cause, but also inherited from the cell type (e.g. RRC UE contexts from macro to pico shall always be considered as CRE information), (2) dedicated, UE-specific CRE information signaled as part of the handover procedure. For example, the X2: HANDOVER REQUEST message could include a new IE named CRE Configuration IE specifically indicating the CRE Offset selected by the Macro eNB for this UE, or (3) cell-relation specific CRE information signaled via X2 (X2 setup request/response, eNB configuration update), which then is applicable to all UEs, or dependent on the UE capability.

Another non-limiting example scenario is now described where CRE usage is coordinated between a macro cell and a pico cell. A Pico eNB is made aware of CRE information from the Macro eNB. The Pico eNB configures all or some of its served UEs with a CRE offset with respect to the macro cell. The configuration may be used for both currently served UEs and UEs that will attach in the future. The CRE information may be based on the load situation in the macro cell as well as the load situation in the pico cell, the UE capability, and/or the pico and/or macro cell uplink sensitivity. The signaling may be initiated by the Macro eNB or by the Pico eNB. In the latter case, the Pico eNB may initialize the signalling due to observed interference and/or load situations.

In this example scenario, the UE is already served by the pico eNB and needs information about interference reduction from the macro eNB in order to appropriately configure handover evaluations with respect to the macro cell. This information can be shared via X2 signaling, for example, and may be a dedicated X2 message, an X2:Load information and Invoke Indication IE, a new Invoke CRE Indication IE, an Invoke RPSF Indication IE, etc.

The pico eNB may consider CRE for a served UE based on the load situation in the pico cell and the macro cell as well as the interference situation. In one example embodiment, the Pico eNB informs the Macro eNB about its load situation, and the Macro eNB responds with updated CRE information. In another example embodiment, the Pico eNB uses existing CRE information from the Macro eNB to update its measurement/evaluation offset, for example, based on the load situation and/or interference situation in the pico and/or macro cells. The measurement offset may be signaled to one or more served UEs, and the evaluation offset may be considered with respect to measurements reported from one or more served UEs.

Figure 10:
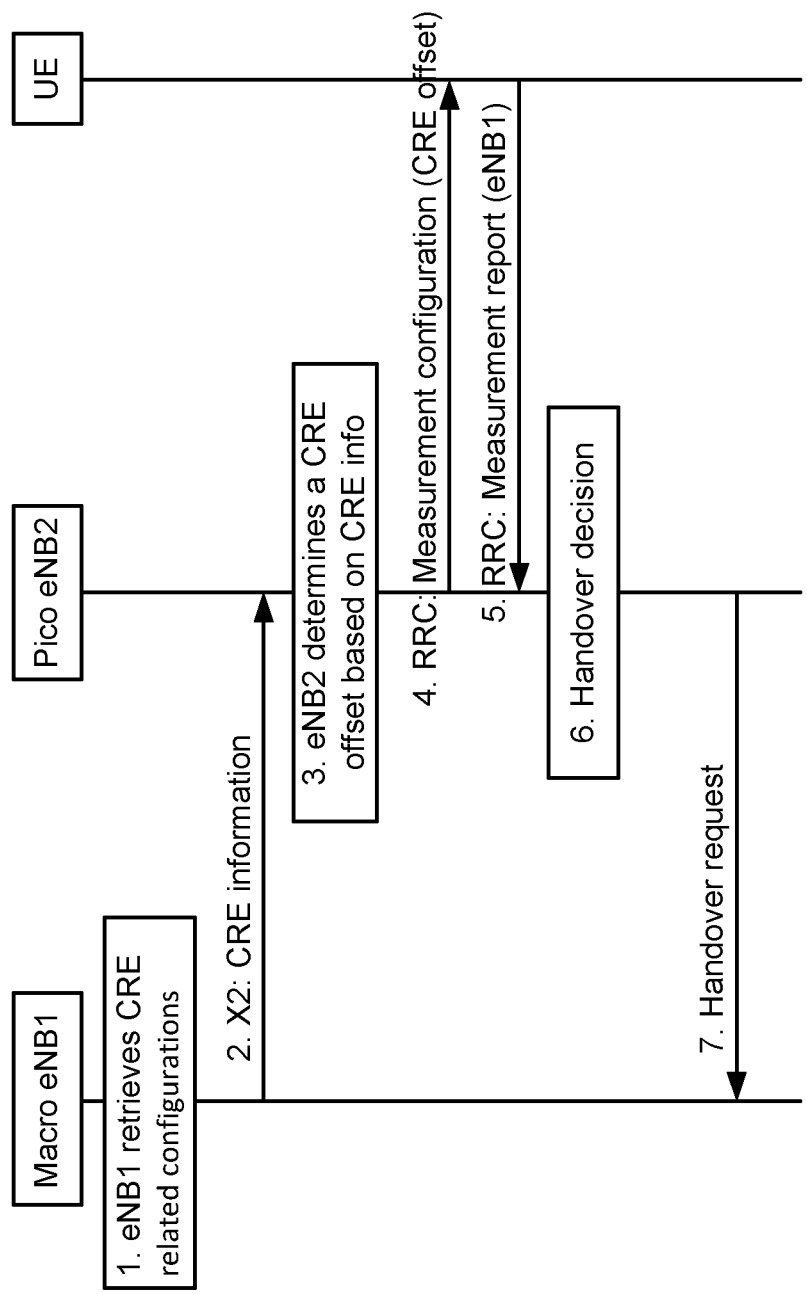
FIG. 10 is a non-limiting example signaling diagram showing a Pico base station determining and providing a CRE offset to a UE based on CRE information received from a Macro base station.

FIG. 10 is a non-limiting example signaling diagram for a situation where a UE initially is served by a pico eNB which illustrates CRE coordination during mobility from Pico to Macro or during attachment to Pico cell. The Pico eNB determines and provides a CRE offset to a UE based on CRE information received from the Macro base station. In step 1), the Macro eNB retrieves CRE related configuration information, determines CRE information (e.g., load, ABS, and/or RPSF information) for the Pico eNB, and sends the CRE information in an X2 message to the Pico eNB in step 2). The X2 may be a non-UE specific message for example. The Pico eNB setups its CRE area according to the information received in this message and prioritizes scheduling the CRE operating UEs in the protected ABS and/or RPSF resources. The Pico eNB may configure UEs with resource-restricted RRM and RLM measurements for proper CRE operations. The Pico eNB may also configure UEs with two types of CSI reports (3GPP TS 36.331): one reflecting radio conditions in protected subframes and one reflecting radio conditions in non-protected subframes. Depending on the CSI reports, the Pico eNB may also schedule cell edge users in non-protected subframes.

A CRE may be associated with a particular UE. In other words, a CRE area extension depends on the UE's capabilities to cancel interference and perform in low geometry conditions (conditions of low SINR). Therefore, it might be that with legacy UEs no CRE extension is possible, but even in this case, scheduling on ABS/RPSF resources can be applied. The Pico eNB determines a CRE offset for one or more UEs being served in the pico cell based on the received CRE information in step 3). The Pico eNB then sends, at step 4), an RRC: Measurement configuration message to the one or more UEs which includes the CRE offset. If the CRE offset parameter is not already configured in one of the UEs, the Pico eNB may configure the UE using this RRC message. The UEs respond with RRC measurement reports including measurements for the Macro eNB in step 5).

The Pico eNB makes a handover decision at step 6) based on the received RRC measurement reports at step 6), and sends a Handover request message to the Macro eNB at step 7).

If the UE connected to the Pico eNB is handed over to the macro cell, as shown in Step 7, the macro eNB deduces from the RRC Container in the X2: HANDOVER REQUEST message whether the UE was operating in a CRE extension or not, and the macro eNB configures the UE accordingly (e.g., configuration of Offset for neighbor cell reporting). Additionally, the X2: HANDOVER REQUEST message may include a new IE named CRE Configuration IE specifically indicating the CRE Offset selected by the Pico eNB for this UE. Step 8 shows the X2 HANDOVER REQUEST ACKNOWLEDGEMENT concluding the handover preparation procedure.

Figure 11:
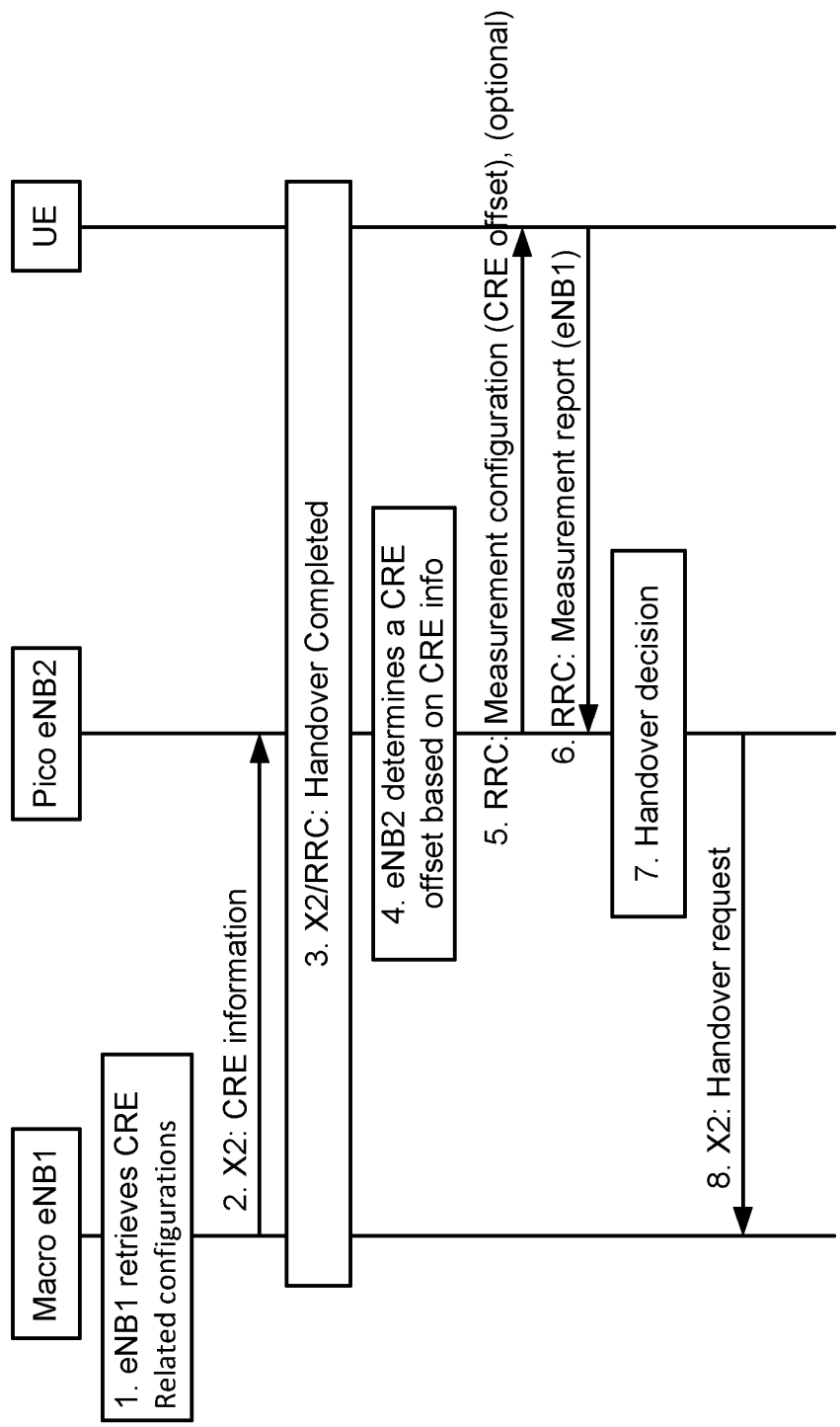
FIG. 11 is another non-limiting example signaling diagram showing a Pico base station determining and providing a CRE offset to a UE based on CRE information received from a Macro base station.

FIG. 11 is another non-limiting example signaling diagram showing a Pico base station determining and providing a CRE offset to a UE based on CRE information received from a Macro base station. Step 1) is the same as in FIG. 10, but at step 2), the Macro eNB sends an X2: Handover Request message to the Pico eNB that includes CRE information. This message in step 2) may be part of handover signal for one or more UEs, but it may also be a non-UE specific message indicating the CRE information. The handover request may indicate that the CRE offset is already a measurement offset, and therefore, configured in the UE, or the CRE offset may be explicitly indicated. In case the CRE offset is already a measurement offset, the step 5 may be unnecessary and can therefore be seen as optional. The Pico performs the handover at step 3), and then determines a CRE offset based on CRE information at step 4). Steps 5)-8) correspond to steps 4)-7) in FIG. 10.

Figure 12:
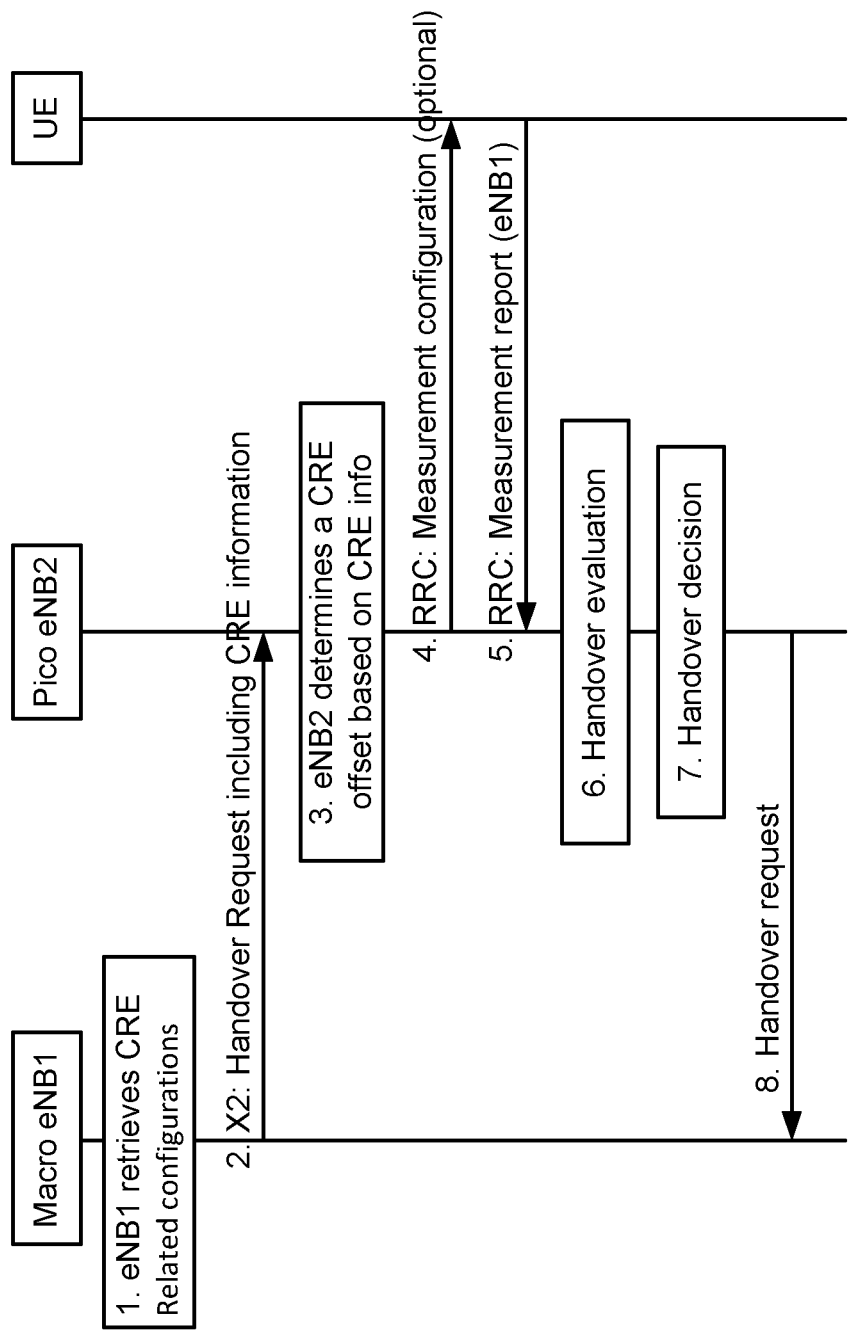
FIG. 12 is another non-limiting example signaling diagram showing a Pico base station determining and providing a CRE offset to a UE based on CRE information received from a Macro base station.

FIG. 12 is another non-limiting example signaling diagram showing a Pico base station determining a CRE offset to a UE based on CRE information received from a Macro base station. The difference to FIG. 11 is that the CRE offset is used in the base station to evaluate handover candidate, which was accomplished by the event triggering in FIG. 11. Steps 1)-3) are similar to those in FIG. 10, but the RRC: Measurement configuration message to the UE is optional, since adequate measurements may already be configured in the UE. As a result, the RRC Measurement report for the Macro eNB from the UE at step 5) is adjusted by the Pico eNB in the handover evaluation step 6) using the CRE offset. Steps 7) and 8) are the same as in FIG. 10.

Figure 13:
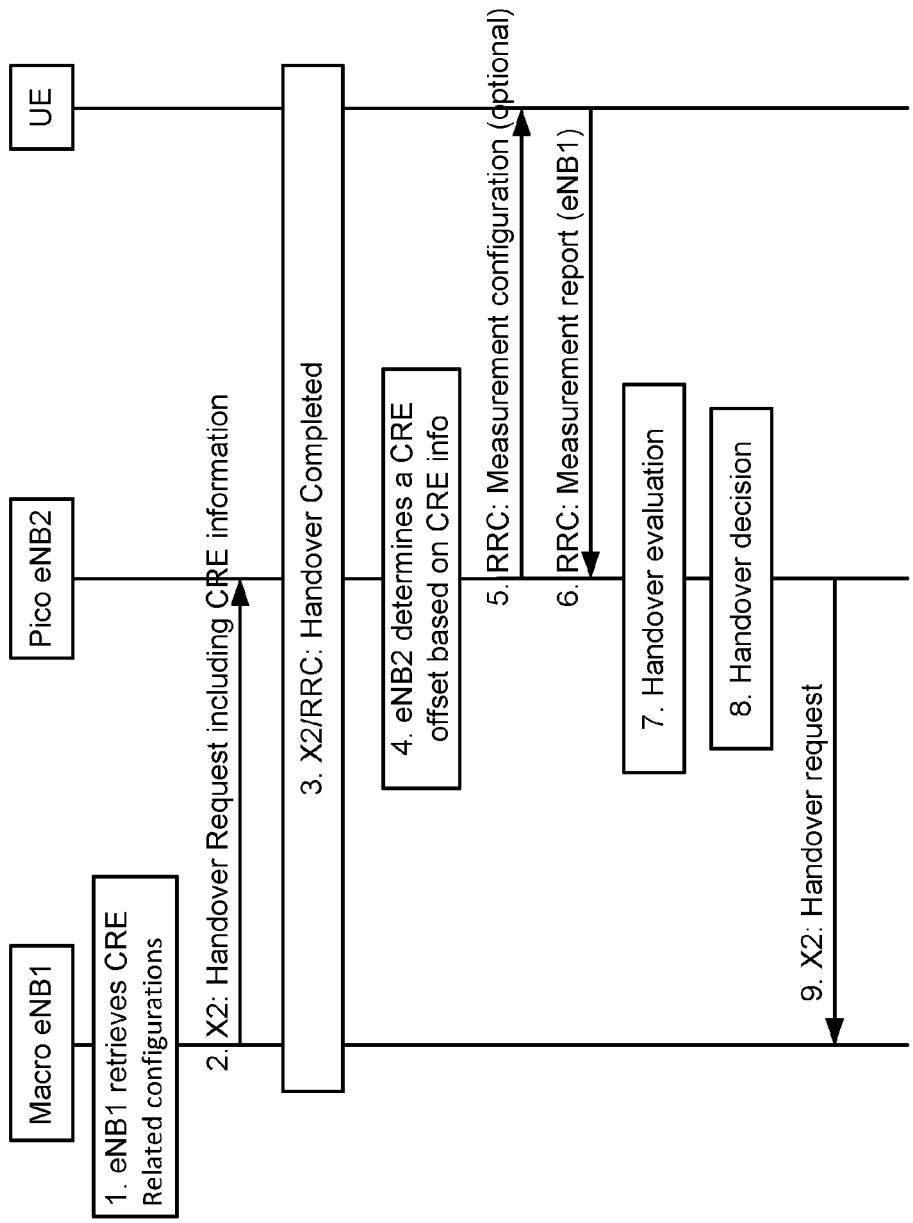
FIG. 13 is another non-limiting example signaling diagram showing a Pico base station determining and providing a CRE offset to a UE based on CRE information received from a Macro base station.

FIG. 13 is another non-limiting example signaling diagram showing a Pico base station determining and providing a CRE offset to a UE based on CRE information received from a Macro base station. It is similar to FIG. 11 except that in FIG. 13, step 5, the measurement is configured to be reported immediately as in step 6. Based on the measurements, the Pico eNB2 evaluates the handover candidates in step 7 to determine valid handover candidates. In FIG. 11, only valid handover candidates will meet the report criterion and trigger the report, and therefore, the validity test is performed in the UE by the event triggering condition. But in FIG. 13, the validity test is evaluated in the Pico eNB2.

The use of CRE in the above example embodiments is related to the use of ABS, RPSF, and/or similar protected subframes. Signaling may also be employed that exchanges of information about ABS, RPSF, and/or similar resources. Another aspect of the technology relates to how RPSF and/or other protected subframe patterns may be used by a Pico eNB. As background for ABS and RPSF, a base station blanks (except some control symbols) time slots to enable other BSs to communicate with their served UEs. The base station may inform other base stations about ABS and/or RPSF with information sent over X2 as a bitmap, e.g., 40 bits over 40 ms, that indicates which subframes are almost blank or at reduced power. The pattern typically repeats itself. UEs may then be configured as described above to measure signals from other cells only during the UE's serving cell's ABS and/or RPSF. A base station may also broadcast where in the frequency domain it intends to transmit data as a bitmap, and the bits in the bitmap indicate if the average power is greater than a relative narrowband transmit power (RNTP) threshold.

The CRE information may include measurement/evaluation offsets themselves, or information about ABS, RPSF, and/or similar power levels (or max power levels) from which measurement/evaluation offsets can be determined, possibly based on UE capability information. The CRE information may be communicated using any suitable signal or message. Non-limiting example LTE X2 messages for conveying the CRE information include: X2 setup/response message, X2 Load information, X2 Resource status information request/response/update, X2 mobility change request/response, X2 eNB configuration update, and/or X2 handover messages.

Consider three non-limiting example mechanisms to signal CRE information in the form of RPSF information. A first mechanism reuses ABS information and redefines the measurement subset of the ABS bit map to indicate ABS and RPSF. In this case, RPSF patterns and ABS patterns will not be distinguishable. A second mechanism introduces a new RPSF pattern to be communicated over X2 similar to the ABS information described for the first mechanism. An X2 LOAD INFORMATION message may be used for example to indicate a new RPSF Information IE and may be similar to the ABS Information IE specified in 3GPP TS 36.423 incorporated here by reference, but with the term ABS replaced by the term RPSF. In this case, the node receiving the X2: LOAD INFORMATION message will be able to distinguish ABS patterns from RPSF patterns. A third mechanism enhances the second mechanism by providing more information about the actual reduced power levels used. One example way is to encode the actual reduced power levels as absolute values or relative to reference powers (e.g., maximum power). Another example way is to encode the actual reduced power levels using two different RNTP thresholds, one for regular transmissions and one for RPSF transmissions. Therefore, the Pico eNB knows the RPSF patterns and the power limit in RPSF subframes.

Figure 14:
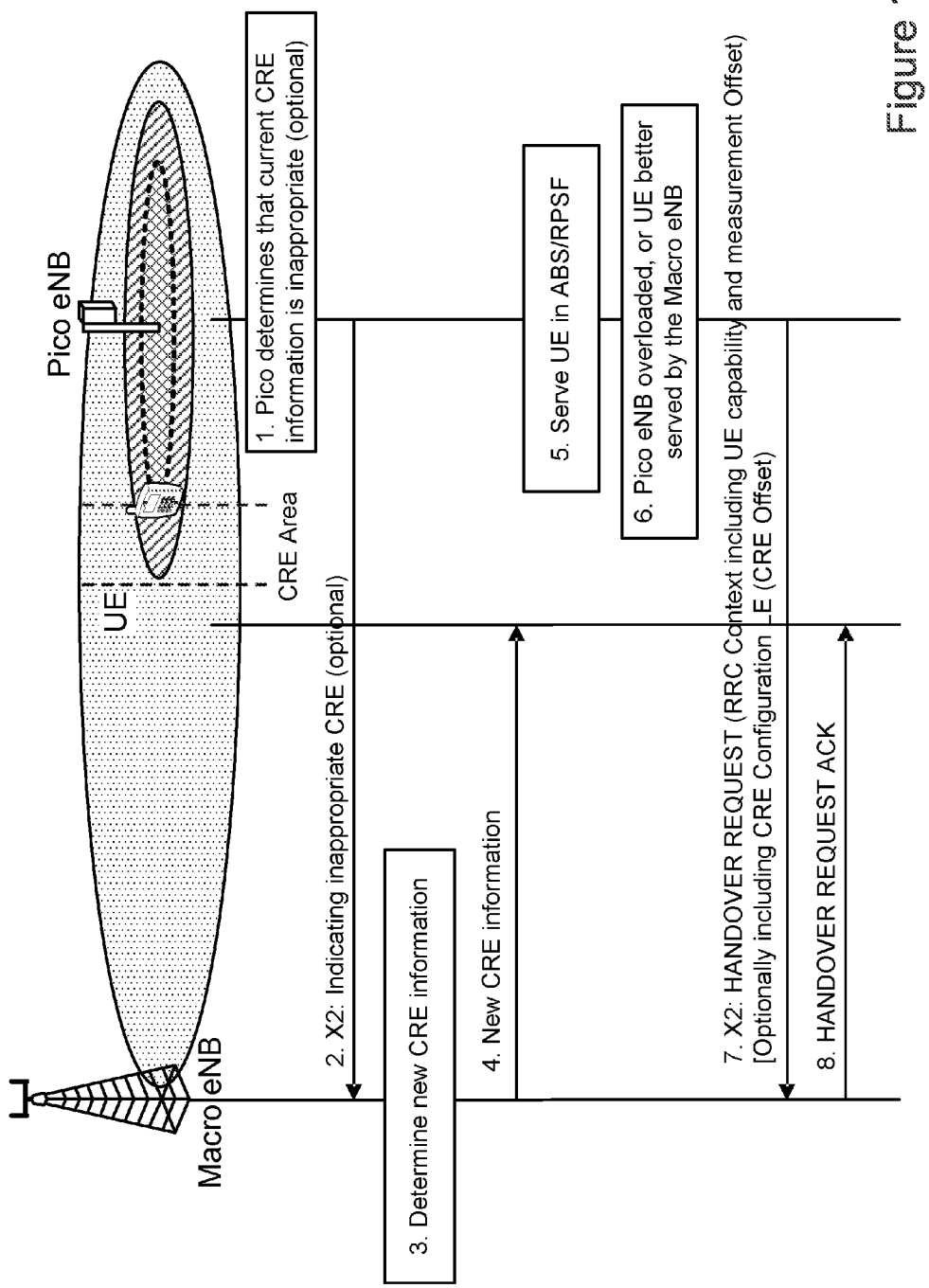
FIG. 14 is a non-limiting example signaling diagram based on a Pico base station determining that current CRE information is inappropriate.

FIG. 14 is a non-limiting example signaling diagram to update CRE information at the Pico base station. At step 1), the Pico eNB determining that the current CRE information is inappropriate, and then at step 2), sends an X2 message to the Macro eNB that the current CRE information is inappropriate. The determination may be based for example on poor CRE region performance, a high load in the pico cell, or other factors. The Macro eNB determines a new CRE at 3) and sends the new CRE information to the Pico eNB at 4). As mentioned above, the CRE information from Macro eNB to Pico eNB may be transferred via (1) an RRC UE context, and possibly also a CRE indication. This indication may be the handover cause, but it may also be inherited from the cell type (e.g., RRC UE contexts from macro to pico may be considered CRE information); (2) dedicated, UE-specific CRE information signaled as part of the handover procedure. For example, the X2: HANDOVER REQUEST message may include a new IE named CRE Configuration IE specifically indicating the CRE Offset selected by the Macro eNB for this UE; or (3) cell-relation specific CRE information signaled via X2 (X2 setup request/response, eNB configuration update, etc.), which is then applicable to all UEs or it may depend on the UE capability.

Figure 15:
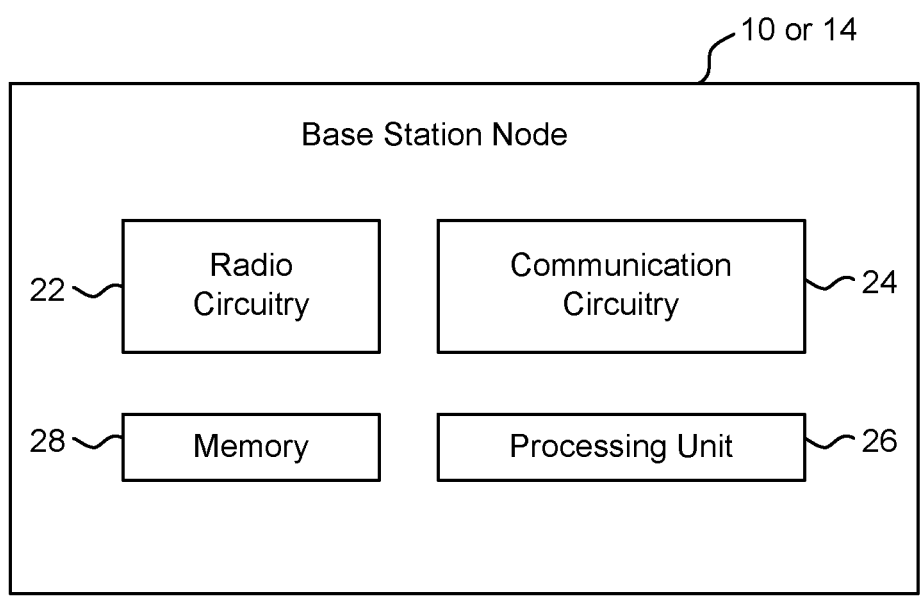
FIG. 15 shows a non-limiting example function block diagram for a base station such as a Pico eNB and a Macro eNB.

FIG. 15 shows a non-limiting example function block diagram of a base station, e.g., an eNB, that may be used to implement the technology described above. The base station 10 and/or 14 includes radio circuitry 22 to communicate with UEs and perhaps other nodes, e.g., relay nodes, communication circuitry 24 to communicate with other radio network and core network nodes, memory 28 to store data information and computer program information, and one or more data processing units 26 for implementing the tasks and steps described above, e.g., using the programs and data stored in memory 28. The radio circuitry 22 is configured to signal communicate with served UEs, including configuring measurement reporting from such UEs. The radio circuitry 22 may be configured to reconfigure the measurement reporting of UEs to include updated cell range expansion information. The communication circuitry 24 is configured to receive information from other base stations. Such information includes cell range expansion (CRE) information which may be either valid for all served UEs or associated to one or more dedicated UEs. The processing unit(s) 26 are configured to use the cell range expansion information, possibly together with UE capability information and load information of served cells and cells served by other base stations, to determine a cell range expansion with respect to a particular neighboring cell, either for one, some, or all served UEs. The processing unit(s) are further configured to extract cell range expansion information from information sent from another base station as well as handover information concerning a particular UE or concerning a particular cell relation. The memory 28 is configured to store information about served UEs as well as information about neighbor cells.

The technology described includes many advantages for cell range extended HetNets. For example, it provides mechanisms to coordinate Cell Range Expansion (CRE) procedures, CRE settings, and/or allocation of protected subframes between macro and pico base stations and their respective cells. This coordination itself has many benefits such as providing consistency between a macro base station and a pico base station when selecting the handover trigger point for mobility to a target cell. The technology described also provides example protocol level details for enhancing existing interface messages to achieve the desired CRE coordination. The technology also has the advantage that a target base station can, after a successfully completed handover, determine whether the existing measurement configuration in the UE meets the intended CRE, and if not, that the UE needs to be reconfigured.

Although the description above contains many specifics, they should not be construed as limiting but as merely providing illustrations of some presently preferred embodiments. For example, non-limiting, example embodiments of the technology were described in an LTE context. But the principles of the technology described may also be applied to other radio access technologies. Indeed, the technology fully encompasses other embodiments which may become apparent to those skilled in the art. Reference to an element in the singular is not intended to mean "one and only one" unless explicitly so stated, but rather "one or more." None of the above description should be read as implying that any particular element, step, range, or function is essential such that it must be included in the claims scope. The scope of patented subject matter is defined only by the claims. The extent of legal protection is defined by the words recited in the allowed claims and their equivalents. All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology described, for it to be encompassed by the present claims. No claim is intended to invoke paragraph 6 of 35 USC § 112 unless the words "means for" or "step for" are used. Furthermore, no embodiment, feature, component, or step in this specification is intended to be dedicated to the public regardless of whether the embodiment, feature, component, or step is recited in the claims.

The invention claimed is:

1. A method for a first base station that provides radio communication service to user equipments, UEs, and has a first cell service area, where the first cell service area is within or adjacent to a second cell service area of a second base station which provides radio communication service to UEs in the second cell service area, the first base station performing the following steps:
   receiving cell range expansion, CRE, information from the second base station for expanding the size of the first cell where the CRE information includes a CRE offset for UE handover measurements that increases a probability of UE handover from the second cell to the first cell;
   evaluating handover of one or more UEs with respect to the second cell based on the CRE information;

determining that the received CRE information is inappropriate;

sending a message to the second base station requesting that the CRE information be reconsidered;

receiving a new CRE information from the second base station for expanding the size of the first cell; and receiving a handover request from the second base station for one or more UEs being served by the second base station.

2. The method in claim 1, wherein the CRE information further includes protected communication time information indicating when there is less interference affecting the first cell from the second cell, the method further comprising:

accepting handover of the one or more UEs from the second base station, and serving the one or more UEs in a cell range expansion region of the first cell during protected communication time periods.

3. The method in claim 1, wherein the CRE information further includes one or more of: a cell load in the second cell, a cell load in the first cell, Almost Blank Subframe (ABS) information associated with the second base station, reduced power subframe information associated with the second base station, one or more measurement or evaluation offsets, maximum power level information, or UE capability information.

4. The method of claim 1, further comprising sending a message to the one or more UEs in a cell range expansion region of the first cell to activate interference cancellation.

5. The method in claim 1, further comprising providing the CRE offset to one or more UEs.

6. The method in claim 5, further comprising receiving UE measurement reports from one or more reporting UEs provided the CRE offset, and determining whether to request handover of the one or more reporting UEs to the second base station.

7. The method in claim 6, further comprising deciding to not send a handover request of the one or more reporting UEs to the second base station having recently been handed over from the second base station to a CRE area of the first cell.

8. The method in claim 1, further comprising receiving handover of a UE connection from the second cell in a CRE area of the first cell.

9. The method in claim 1, further comprising receiving the CRE information from the second base station in one of the following: a radio resource control, RRC, UE context, a handover cause, a dedicated UE-specific CRE information element including in signaling from the second base station, or cell-relation specific information control signaling.

10. The method of claim 1, wherein the first base station has a lower output power than the second base station, and the service area of the first cell is smaller than the service area of the second cell.

11. A method for a second base station that provides radio communication service to user equipments, UEs, in a second cell service area within or adjacent to a first cell service area served by a first base station that provides radio communication service to UEs in a first cell service area, the second base station having a set of handover candidate base stations including the first base station and performing the following steps:

determining cell range expansion, CRE, information for expanding the size of a first cell for at least one of the candidate base stations where the CRE information includes a CRE offset for UE handover measurements that increases a probability of UE handover from the second cell to the first cell;

evaluating handover of one or more UEs with respect to the first cell based on the CRE information;

receiving from the first base station a message that the CRE information is inappropriate, and in response, determining new CRE information;

sending the new CRE information to the first base station;

receiving one or more measurement reports from the one or more UEs relating to the first base station;

evaluating a possible handover of the one or more UEs to the first base station based on the CRE offset applied to the one or more measurement reports; and based on the evaluation, sending a handover request to the first base station for the one or more UEs being served by the second base station.

12. The method in claim 11, wherein the CRE information further includes protected communication time information indicating when there is less interference affecting the first cell from the second cell.

13. The method in claim 11, wherein the CRE information further includes one or more of: a cell load in the cell, a cell load in the second cell, Almost Blank Subframe (ABS) information associated with the second base station, reduced power subframe information associated with the second base station, one or more measurement or evaluation offsets, maximum power level information, or UE capability information.

14. The method in claim 11, further comprising:

determining the CRE offset based on the CRE information with respect to the first cell;

sending the CRE offset to one or more UEs being served by the second base station for the first base station;

receiving one or more measurement reports from the one or more UEs relating to the first base station; and sending a handover request to the first base station for the one or more UEs being served by the second base station.

15. The method in claim 11, further comprising:

determining a CRE related configuration that includes the CRE information with respect to the first cell;

sending the CRE information to the first base station;

receiving a handover request from the first base station for one or more UEs being served by the first base station.

16. The method in claim 11, further comprising providing the CRE offset to one or more UEs.

17. A first base station that provides radio communication service to user equipments, UEs, and has a first cell service area, where the first cell service area is within or adjacent to a second cell service area of a second base station that provides radio communication service to UEs in the second cell service area, the first base station comprising:

communications circuitry configured to receive cell range expansion, CRE, information from the second base station for expanding the size of the first cell where the CRE information includes a CRE offset for UE handover measurements that increases a probability of UE handover from the second cell to the first cell;

data processing circuitry configured to evaluate handover of one or more UEs with respect to the second cell based on the CRE information and determine that the received CRE information is inappropriate;

wherein in response to the determining, the communications circuitry is configured to send a message to the second base station requesting that the CRE information be reconsidered;

the communications circuitry is configured to receive a new CRE information from the second base station for expanding the size of the first cell; and the communications circuitry is configured to receiving a handover request from the second base station for one or more UEs being served by the second base station.

18. The first base station in claim 17, wherein the first base station is a pico base station, a micro base station, a home base station, or a relay.

19. The first base station in claim 17, wherein the CRE information further includes protected communication time information indicating when there is less interference affecting the first cell from the second cell, the first base station being configured to:
  accept handover of the one or more UEs from the second base station, and
  serve the one or more UEs in a cell range expansion region of the first cell during protected communication time periods.

20. The first base station of claim 17, further comprising radio circuitry configured to send a message to the one or more UEs in a cell range expansion region of the first cell to activate interference cancellation.

21. The first base station of claim 17, wherein the first base station further comprises radio circuitry configured to provide the CRE offset to one or more UEs.

22. The first base station of claim 21, wherein the radio circuitry is configured to receive UE measurement reports from one or more reporting UEs provided the CRE offset, and wherein the data processing circuitry is configured to determine whether to request handover of the one or more reporting UEs to the second base station and to decide to not send a handover request of the one or more reporting UEs to the second base station having recently been handed over from the second base station to a CRE area of the first cell.

23. The first base station of claim 17, further comprising radio circuitry configured to receive the CRE information from the second base station in one of the following: a radio resource control, RRC, UE context, a handover cause, a dedicated UE-specific CRE information element including in signaling from the second base station, or cell-relation specific information control signaling.

24. The first base station in claim 17, wherein the first base station has a lower output power than the second base station, and the service area of the first cell is smaller than the service area of the second cell.

25. A second base station that provides radio communication service to user equipments, UEs, in a second cell service area within or adjacent to a first cell service area, served by a first base station that provides radio communication service to UEs in the first cell service area, the second base station having a set of handover candidate first base stations and comprising data processing circuitry configured to:
  determine cell range expansion, CRE, information for expanding the size of a first cell for at least one of the candidate first base stations where the CRE information includes a CRE offset for UE handover measurements that increases a probability of UE handover from the second cell to the first cell; and
  evaluate handover of one or more UEs with respect to the first cell based on the CRE information; and radio circuitry configured to receive from the first base station a message that the CRE information is inappropriate, wherein in response to the message, the data processing circuitry is configured to determine new CRE information and send the new CRE information to the first base station;

the radio circuitry configured to receive one or more measurement reports from the one or more UEs relating to the first base station;

the data processing circuitry is configured to evaluate a possible handover of the one or more UEs to the first base station based on the CRE offset applied to the one or more measurement reports; and based on the evaluation, the radio circuitry configured to send a handover request to the first base station for the one or more UEs being served by the second base station.

26. The second base station in claim 25, wherein the CRE information further includes protected communication time information indicating when there is less interference affecting the first cell from the second cell.

27. The second base station in claim 25, wherein the data processing circuitry is configured to:
  process one or more measurement reports received by radio circuitry from the one or more UEs relating to the first base station;
  evaluate a possible handover of the one or more UEs to the first base station based on the CRE offset applied to the one or more measurement reports; and
  based on the evaluation, generate a handover request to be sent by the radio circuitry to the first base station for the one or more UEs being served by the second base station.

28. The second base station in claim 25, wherein the second base station includes radio circuitry configured to send the CRE offset to one or more UEs being served by the second base station for use by the one or more UEs in making a handover measurement of the first base station and to receive one or more measurement reports from the one or more UEs relating to the first base station, and
  wherein the second base station includes communication circuitry configured to send a handover request to the first base station for the one or more UEs being served by the second base station.

29. The second base station in claim 25, wherein the data processing circuitry is configured to provide the CRE offset, via radio circuitry, to one or more UEs.

30. The second base station in claim 25, wherein the data processing circuitry is configured to determine a CRE related configuration that includes the CRE information with respect to the first cell; and
  wherein the second base station includes radio circuitry configured to send the CRE information to the first base station and process a handover request received from the first base station for one or more UEs being served by the first base station.

31. The second base station in claim 25, wherein the first base station has a lower output power than the second base station, and the service area of the first cell is smaller than the service area of the second cell.

* * * * *